United States Patent [19]

Shealy

[11] Patent Number: 4,793,458

[45] Date of Patent: Dec. 27, 1988

[54] SHIFT MOTOR ASSEMBLY FOR A TWO-SPEED AXLE

[75] Inventor: Noah A. Shealy, Fort Wayne, Ind.

[73] Assignee: Dana Corporation, Toledo, Ohio

[21] Appl. No.: 118,664

[22] Filed: Nov. 9, 1987

[51] Int. Cl.[4] .................... F16H 25/24; G05G 3/00; F16D 71/04

[52] U.S. Cl. .................... 192/141; 74/89.15; 74/335; 74/473 R; 192/143; 200/47; 318/468; 318/475

[58] Field of Search ............... 74/89.15, 424.8 R, 335, 74/473 R; 192/109 A, 141, 143; 200/47; 318/468, 475

[56] References Cited

U.S. PATENT DOCUMENTS

| | | | |
|---|---|---|---|
| 1,225,144 | 5/1917 | Land . | |
| 1,258,921 | 3/1918 | McCarrell . | |
| 1,546,672 | 7/1925 | Peacock . | |
| 1,551,512 | 8/1925 | Goff | 318/468 X |
| 1,696,178 | 12/1928 | Ahlm . | |
| 1,822,335 | 9/1931 | Brown . | |
| 2,280,641 | 4/1942 | Snow | 74/477 |
| 2,446,393 | 8/1948 | Russell | 318/468 X |
| 2,508,564 | 5/1950 | Cardwell et al. | 74/364 |
| 2,649,813 | 8/1953 | Barth et al. | 74/335 |
| 2,709,725 | 5/1955 | Bieber et al. | 200/4 |
| 3,319,479 | 5/1967 | Iavelli et al. | 74/333 |
| 3,367,205 | 2/1968 | Ratliff | 74/477 |
| 3,625,633 | 12/1971 | Nelson | 192/94 X |
| 3,669,476 | 6/1972 | Wilson | 287/53 R |
| 4,220,051 | 9/1980 | Catlett | 74/89.15 |
| 4,261,536 | 4/1981 | Melcher et al. | 74/424.8 R |
| 4,354,396 | 10/1982 | Charles | 74/89.15 X |
| 4,381,166 | 4/1983 | Smart | 74/89.15 X |
| 4,425,814 | 1/1984 | Dick | 74/89.15 |
| 4,428,248 | 1/1984 | Broucksou et al. | 192/109 A X |
| 4,440,035 | 4/1984 | Foulk | 74/89.15 |
| 4,449,416 | 5/1984 | Huitema | 74/473 R X |
| 4,498,350 | 2/1985 | Ross | 74/89.15 |
| 4,619,151 | 10/1986 | Trachman et al. | 192/143 X |

FOREIGN PATENT DOCUMENTS 55-60727  5/1980  Japan .
325263   2/1930  United Kingdom .

Primary Examiner—Allan D. Herrmann
Attorney, Agent, or Firm—MacMillan, Sobanski & Todd

[57] ABSTRACT

An improved shift motor assembly for selectively moving a shift rod or similar member between two gear-engaging positions for use, for example, in a two-speed axle assembly is disclosed. The assembly includes a mechanism for limiting the amount of linear movement of a drive nut of a gear changing apparatus. The movement limiting mechanism interrupts an electrical circuit between a source of electrical energy and a bi-directional motor utilized to move the drive nut, thereby preventing linear movement of the drive nut beyond predetermined limit positions in either directions. The movement limiting mechanism includes a movable electrical contact which normally engages a stationary electrical contact. The movable and stationary electrical contacts form a single pole, single throw electrical switch which is connected in series between the source of electrical energy and the motor. When the dirve nut is moved in a first linear direction to a predetermined limit position, it engages the movable electrical contact and moves such contact out of engagement with the stationary electrical contact. As a result, the motor is disabled from further moving the drive nut from being further moved in the first direction. A second movable electrical contact and a second stationary electrical contact are provided to limit the linear movement of the drive nut in a second linear direction, opposite to the first direction.

9 Claims, 3 Drawing Sheets

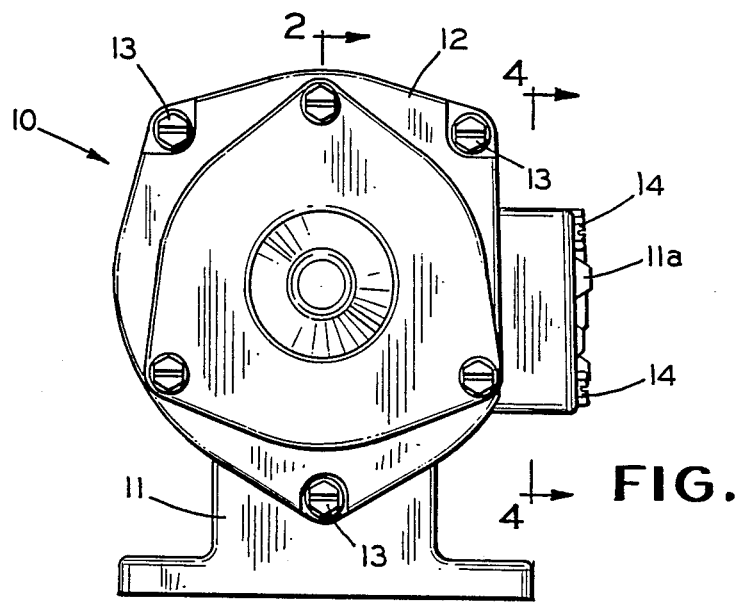
FIG. 1
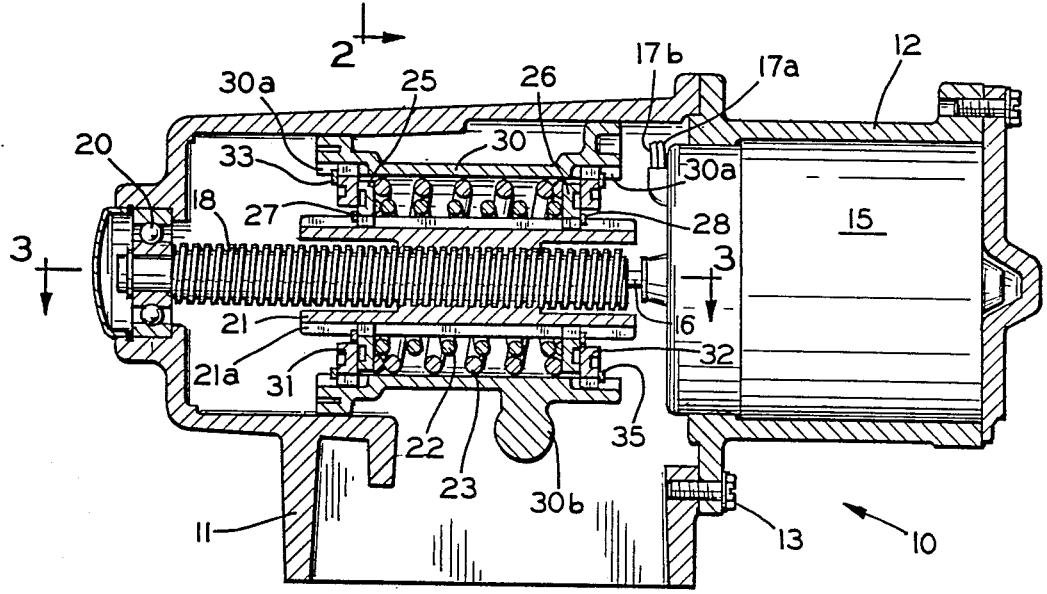
FIG. 2
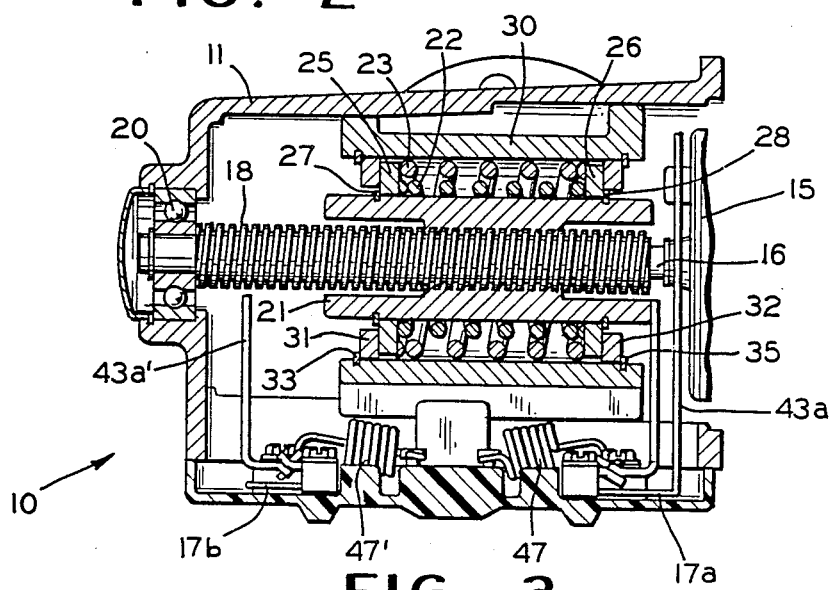

SHIFT MOTOR ASSEMBLY FOR A TWO-SPEED AXLE

BACKGROUND OF THE INVENTION

The present invention relates in general to speed change mechanisms and in particular to an improved shift motor assembly for selectively moving a shift rod between two gear-engaging positions in a two-speed axle assembly.

Shifting mechanisms are well known in the art for selectively moving a shift fork or similar member linearly between two gear-engaging positions. Such shifting mechanisms usually include a driving device, such as a motor, which is intermittently energized to move the shift fork in a desired direction. Typically, the motor rotates a threaded shaft or screw in either a clockwise or counter-clockwise direction. A drive nut is non-rotatably mounted on the threaded shaft such that rotation of the shaft causes linear movement of the drive nut along the length of the shaft. The direction of such linear movement is determined by the direction of rotation of the threaded shaft. The shift fork is connected to the drive nut so as to be moved linearly therewith.

More recently, some shifting mechanisms have replaced the direct connection between the drive nut and the shift fork with a resilient connection. Such a resilient connection provides a means for biasing or urging the shift fork in the desired linear direction toward the selected gear-engaging position when the drive nut is linearly moved as described above. As a result, the actual movement of the shift fork between the gear-engaging positions may be delayed until the biasing force generated by the resilient connection exceeds any forces tending to resist movement of the shift rod, such as friction caused by torque between the gear-engaging elements. Springs and similar resilient devices have been provided for this purpose. In either type of shifting mechanism, it is desirable to provide some means for limiting the maximum amount of movement of the drive nut along the threaded shaft.

SUMMARY OF THE INVENTION

The present invention relates to an improved shift motor assembly for selectively moving a shift rod or similar member between two gear-engaging positions for use, for example, in a two-speed axle assembly. The shift motor assembly includes an electrically energized bi-directional motor having a rotatable output shaft connected to a threaded screw. A non-rotatable drive nut having a complementary threaded aperture is disposed about the threaded shaft. Rotation of the threaded shaft by the motor causes linear movement of the drive nut. The direction of such linear movement is determined by the direction of rotation of the output shaft and the screw. A hollow cylindrical shift sleeve is disposed co-axially about the drive nut. The shift sleeve is connected to a shift fork which, in turn, is connected to a gear changing mechanism. A resilient connection is provided between the drive nut and the shift sleeve. Rotation of the threaded shaft biases the shift sleeve and the shift fork in a desired direction toward a selected one of the two gear-engaging positions in the gear changing mechanism.

A movement limiting mechanism is provided to limit the amount of the linear movement of the drive nut in either direction. The movement limiting mechanism is adapted to interrupt an electrical circuit utilized to energize the motor, thereby preventing linear movement of the drive nut beyond predetermined limit positions. The movement limiting mechanism includes a movable electrical contact which normally engages a stationary electrical contact. The movable and stationary electrical contacts form a single pole, single throw electrical switch which is connected in series between the motor and a source of electrical energy. When the drive nut is moved in a first linear direction to a predetermined limit position, it engages the movable electrical contact and moves such contact out of engagement with the stationary electrical contact. As a result, the motor is disabled from further moving the drive nut from being further moved in the first direction. A second movable electrical contact and a second stationary electrical contact are provided to limit the linear movement of the drive nut in a second linear direction.

It is an object of the present invention to provide an improved shift motor assembly for selectively moving a shift rod between two gear-engaging positions in a twospeed axle assembly.

It is another object of the present invention to provide such an improved shift motor assembly with a movement limiting mechanism to limit the amount of movement of certain components within the assembly in either direction.

It is a further object of the present invention to provide such an improved shift motor assembly which is relatively simple and inexpensive in construction and operation.

Other objects and advantages of the present invention will become apparent to those skilled in the art from the following detailed description of the preferred embodiment, when read in light of the accompanying drawings.

BRIEF DESCRIPTION OF THE DRAWINGS

FIG. 1 is an end elevational view of an improved shift motor assembly in accordance with the present invention.

FIG. 2 is a sectional elevational view of the shift motor assembly taken along line 2—2 of FIG. 1.

FIG. 3 is a sectional elevational view of the shift motor assembly taken along line 3—3 of FIG. 2.

DETAILED DESCRIPTION OF THE PREFERRED EMBODIMENT

Figure 4:
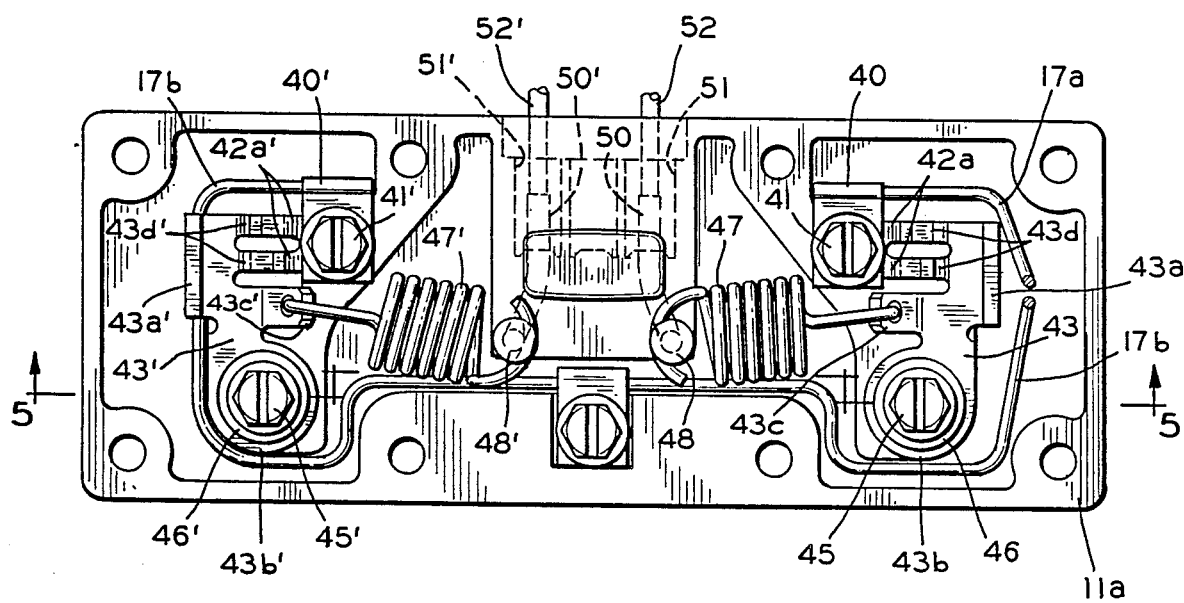
FIG. 4 is an enlarged sectional elevational view of a movement limiting mechanism of the shift motor assembly taken along line 4—4 of FIG. 1.

Referring now to the drawings, there is illustrated in FIGS. 1 through 3 an improved shift motor assembly, indicated generally at 10, in accordance with the present invention. The shift assembly 10 includes a shifter housing 11 having a motor housing 12 secured thereto by a plurality of threaded fasteners 13. The shifter housing 11 includes a removable cover portion 11a which is secured thereto by a plurality of threaded fasteners 14. A conventional electric motor 15 is disposed within the motor housing 12. A rotatable output shaft 16 extends outwardly from the motor 15. The motor 15 is energized to rotate the output shaft 16 by supplying an electric current thereto through one of two electrical conductors 17a and 17b. The motor 15 is capable of rotating the output shaft 16 in either of two rotational directions. In a manner which is well known, the particular direction of rotation is determined by which of the electrical conductors 17a and 17b is utilized to supply the electrical current to the motor 15. In other words, the motor 15 will rotate the output shaft 16 in a first rotational direction when the electrical current is supplied to the motor 15 through the first conductor 17a and in a second rotational direction, opposite to the first rotational direction, when the electrical current is supplied to the motor 15 through the second conductor 17b.

A screw 18 is connected to the output shaft 16 of the motor 15 for rotation therewith. The screw 18 includes a threaded outer surface which extends throughout most of the axial length thereof. However, the screw 18 terminates in a cylindrical end portion. The cylindrical end portion of screw 18 is journalled in a bearing 20 retained in the shifter housing 11. Thus, the screw 18 is supported for rotation within the shifter housing 11. A drive nut 21 is provided which is generally hollow cylindrical in shape. The drive nut 21 includes an axially oriented aperture formed therethrough having a threaded inner surface. The drive nut 11 is non-rotatably disposed about the screw 18 such that the threaded inner surface of the drive nut 21 cooperates with the threaded outer surface of the screw 18. As is well known in the art, rotation of the screw 18 by the motor 55 causes the drive nut 21 to move linearly along the axial length of the screw 18. The direction of linear movement of the drive nut 21 is determined by the direction of rotation of the screw 18. In other words, if the screw 18 is rotated in the first rotational direction, the drive nut 21 will be moved in a first linear direction. If the screw 18 is rotated in the second rotational direction, the drive nut 21 will be moved in a second linear direction, opposite to the first linear direction. Throughout this discussion, the first linear direction will be from left to right in FIGS. 2 and 3, while the second linear direction will be from right to left.

The outer surface of the drive nut 21 is splined, as best shown in FIG. 2 at 21a. A pair of springs 22 and 23 are disposed co-axially about the drive nut 21. The springs 22 and 23 extend between a pair of annular inner stop plates 25 and 26, which are also disposed co-axially about the drive nut 21. The inner stop plates 25 and 26 include central apertures formed therethrough which are splined in complementary fashion with the splined outer surface 21a of the drive nut 21. Thus, the inner stop plates 25 and 26 are permitted to move axially along the drive nut 21, but are prevented from rotating relative thereto. The axial movements of the inner stop plates 25 and 26 are limited by respective snap rings 27 and 28, which are retained in respective grooves formed in the splined outer surface 21a of the drive nut 21. The inner stop plate 25 (on the left when viewing FIGS. 2 and 3) is disposed between snap ring 27 and the springs 22 and 23, while the inner stop plate 26 (on the right when viewing FIGS. 2 and 3) is disposed between the snap ring 28 and the springs 22 and 23. Thus, the springs 22 and 23 urge the inner stop plates 25 and 26 axially apart from one another into engagement with the snap rings 27 and 28.

A shift sleeve 30 is provided having a generally hollow cylindrical shape. The shift sleeve 30 defines an axially oriented cylindrical inner surface and is disposed about the drive nut 21. The inner surface of the shift sleeve 30 includes opposed end portions 30a which are splined, while the central portion of the inner surface is smooth. A pair of annular outer stop plates 31 and 32 are disposed within the shift sleeve 30. The outer surfaces of the outer stop plates 31 and 32 are splined in complementary fashion with the splined end portions 30a of the shift sleeve 30. Thus, the outer stop plates 31 and 32 are permitted to move axially within the end portions 30a of inner surface of the shift sleeve 30, but are prevented from rotating relative thereto. The axial movements of the outer stop plates 31 and 32 are limited by respective snap rings 33 and 35, which are retained in respective grooves formed in the interior surface of the shift sleeve 30. As shown in FIGS. 2 and 3, the inner stop plates 25 and 26 radially overlap the outer stop plates 31 and 32. Thus, the outer stop plate 31 (on the left in FIGS. 2 and 3) is disposed between snap ring 33 and the inner stop plate 25, while the outer stop plate 32 (on the right in FIGS. 2 and 3) is disposed between the snap ring 35 and the inner stop plate 26.

The shift sleeve 30 has a radially outwardly extending boss 30b formed integrally therewith or otherwise secured thereto. The boss 30b is adapted to be engaged by a conventional shift fork (not shown) connected to a gear changing mechanism. The gear changing mechanism is well known in the art and typically includes means responsive to the linear movement of the shift fork for connecting an input member of an axle assembly to an output member through a selected one of two different gear ratio paths. A first gear ratio path is selected by moving the shift fork to a first gear-engaging position, while a second gear ratio path is selected by moving the shift fork to a second gear-engaging position. These gear-engaging positions are typically defined by the limits of the linear movement of the shift sleeve 30. In other words, when the shift sleeve 30 is linearly moved to one end of the shift motor assembly 10 by rotation of the screw 18, the gear changing mechanism selects the first gear-engaging position. When the shift sleeve 30 is linearly moved to the other end of the shift motor assembly 10 by rotation of the screw 18, the gear changing mechanism selects the second gear-engaging position.

The operation of the shift motor assembly 10 thus far described will be explained. As mentioned above, when the motor 15 is energized to rotate the output shaft 16 and the screw 18 in the first rotational direction, the drive nut 21 is moved in the first linear direction (i.e., toward the right in FIGS. 2 and 3). As a result, the left snap ring 27 will cause the left inner stop plate 25 to move toward the right along with the drive nut 21. If the gear changing mechanism is loaded or otherwise under torque when this occurs, the shift sleeve 30 will be held in its position by the shift fork. Consequently, the springs 22 and 23 will be compressed between the left inner stop plate 25, which moves with the drive nut 21, and the right stop plate 26, which is held stationary by virtue of its abutment with the right outer stop plate 32. A biasing force is thus exerted against the right inner stop plate 26, the right outer stop plate 32, and the shift sleeve 30. This biasing force is maintained until the load on the gear changing mechanism is released, at which time the shift sleeve 30 will be moved toward the right to the other gear engaging position. Movement o the shift sleeve 30 in the opposite linear direction is accomplished in a similar manner by causing the motor 15 to rotate the screw 18 in the second rotational direction.

Figure 5:
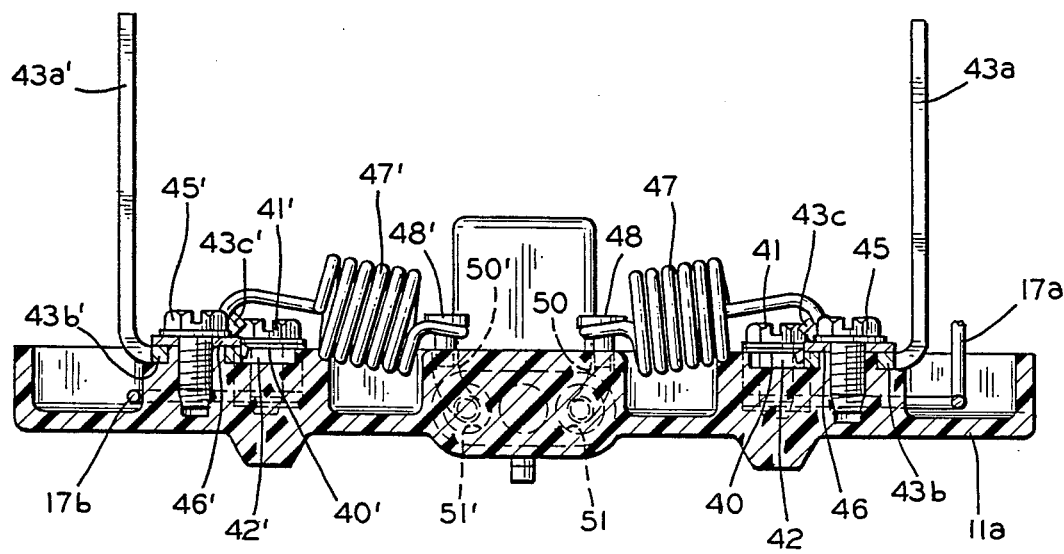
FIG. 5 is a sectional elevational view of the movement limiting mechanism taken along line 5—5 of FIG. 4.
Figure 6:
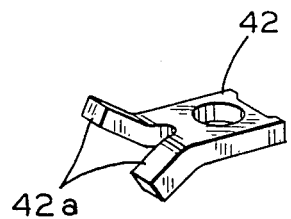
FIG. 6 is a perspective view of a stationary electrical contact utilized in the movement limiting mechanism illustrated in FIGS. 4 and 5.

The present invention includes a mechanism for limiting the amount of linear movement of the drive nut 21 in either direction. Such limiting mechanism is adapted to interrupt the electrical current supplied to the motor 15 (and thereby disable the motor 15) when the drive nut 21 is moved to a predetermined position at either end of the screw 18. The movement limiting mechanism is illustrated in FIGS. 3 through 5. As best shown in FIG. 4, the first electrical conductor 17a from the motor 15 is connected to a generally L-shaped terminal 40. The terminal 40 is secured to the cover portion 11a of the shifter housing 1 by a threaded fastener 41. A stationary electrical contact 42 is also secured to the cover portion 11a of the shifter housing 11 by the threaded fastener 41. The structure of the stationary electrical contact 42 is illustrated more clearly in FIG. 6. As shown therein, the stationary electrical contact 42 includes an aperture formed therethrough and a pair of contact portions 42a. The contact portions 42a are angled in opposite directions from one another, one upwardly and one downwardly. The threaded fastener 41 extends through the aperture formed in the stationary electrical contact 42 in order to secure it to the cover portion 11a.

Figure 7:
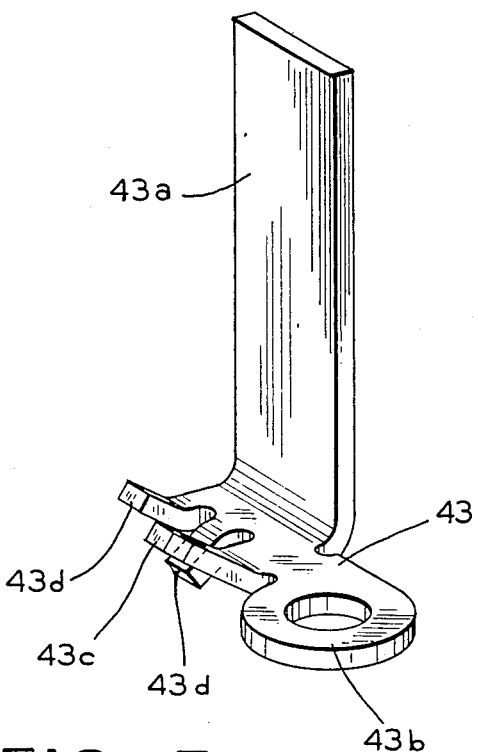
FIG. 7 is a perspective view of a movable electrical contact utilized in the movement limiting mechanism illustrated in FIGS. 4 and 5.

A movable electrical contact 43 is provided within the shifter housing 11. The structure of the movable electrical contact 43 is more clearly illustrated in FIG. 7. As shown therein, the movable electrical contact 43 includes an elongated arm portion 43a, a circular head portion 43b having an aperture formed therethrough, an angled protruding portion 43c having an aperture formed therethrough, and a pair of contact portions 43d. The contact portions 43d are angled in opposite directions from one another, one upwardly and one downwardly. The movable electrical contact 43 is secured to the cover portion 11a of the shifter housing 11 by a threaded fastener 45. The threaded fastener 45 extends through the aperture formed in the head portion 43b into engagement with the cover portion 11a in order to secure the movable electrical contact 43 to the cover portion 11a. A washer 46 is disposed between the threaded fastener 45 and the head portion 43b. The washer 46 permits the movable electrical contact 43 to pivot about the threaded fastener 45.

A coil spring 47 is provided having a first end which is hooked through the aperture formed through the angled protruding portion 43c of the movable electrical contact 43. A second end of the coil spring 47 is hooked about an upstanding post 48. The post 48 is secured to the cover portion 11a in a manner which is described in detail below. The post 48 includes an enlarged head portion which prevents the second end of the coil spring 47 from slipping off the top of the post 48. The coil spring 47 is provided to urge the movable electrical contact 43 to pivot inwardly (counterclockwise when viewing FIG. 4) toward the stationary electrical contact 42.

The stationary electrical contact 42 is disposed such that the contact portions 42a thereof are aligned with the contact portions 43d of the movable electrical contact 43, as best shown in FIG. 4. The upwardly angled stationary contact portion 42a is aligned with the downwardly angled movable contact portion 43d and vice versa. Thus, when the coil spring 47 urges the movable electrical contact 43 to pivot as described above, the movable contact portions 43d will slidably engage the stationary contact portions 22a. If the movable electrical contact 43 is pivoted away from the stationary electrical contact 42, the movable contact portions 43d will freely re-engage the stationary contact portions 42a when the movable electrical contact 43 subsequently pivots back. Thus, the combination of the movable and stationary electrical contacts 42 and 43 form a single pole, single throw electrical switch (illustrated schematically as 63 in FIG. 8) connected in series with the first electrical conductor 17a. Because of the urging of the coil spring 47, this electrical switch 63 is normally maintained in a closed position.

The coil spring 47 and the post 48 are both formed from an electrically conductive material. The post 48 is pressed into a hollow tube 50 which is disposed within a passageway 51 formed in the cover portion 11a. The hollow tube 50 is also formed from an electrically conductive material. An electrical conductor 52 is connected to the hollow tube. The electrical conductor 52 extends through the passageway 51 out of the shifter housing 11 to a source of electrical energy (indicated as 60 in FIG. 8).

As mentioned above, the coil spring 47 urges the movable electrical contact 43 to pivot inwardly toward the stationary electrical contact 42 so as to normally maintain the movable contact portions 43d in engagement with the stationary contact portions 42a. The elongated arm portion 43a of the movable electrical contact 43 is disposed within the shifter housing 11 such that it extends into the path of linear movement of the drive nut 21 when the drive nut 21 is moved in a first direction. Thus, when the drive nut 21 is moved toward the right in FIGS. 2 and 3 as described above, the right edge of the drive nut 21 moves into engagement with the elongated arm portion 43a of the movable electrical contact 43 at a predetermined right end limit position, as shown in FIG. 3. When this occurs, further movement of the drive nut 21 causes the movable electrical contact 43 to pivot in clockwise fashion (when viewing FIG. 4) until the contact portions 43d thereof are separated from the contact portions 42a of the stationary electrical contact 42. As will be explained in detail below, this separation of the movable contact portions 43d from the stationary contact portions 42a functions to open the single pole, single throw switch 63 from its normally closed position.

As will be explained in greater detail below, the above-described components of the movement limiting mechanism operate to limit the linear movement of the drive nut 21 when it is moved in the first direction (toward the right in FIGS. 2 and 3). A similar set of components is provided in the movement limiting mechanism to limit the linear movement of the drive nut 21 when it is moved in the second direction (toward the left in FIGS. 2 and 3). These similar components are also illustrated in FIGS. 3 through 5, and like reference numerals are utilized to designate like components. For example, the movement limiting mechanism includes a second stationary electrical contact 42' and a second movable electrical contact 43'. The stationary electrical contact 42' is connected to the second conductor 17b extending from the motor 15. The second stationary electrical contact 42' and the second movable electrical contact 43' function as a second single pole, single throw switch (indicated as 65 in FIG. 8). The structure of the second stationary electrical contact 42' is identical to the structure of the first stationary electrical contact 42, while the structure of the second movable electrical contact 43' is a mirror image to the structure of the first movable electrical contact 43. The drive nut 21 engages and pivots the second movable electrical contact 43' in a manner similar to that described above when the drive nut 21 is moved toward a predetermined left limit position.

Figure 8:
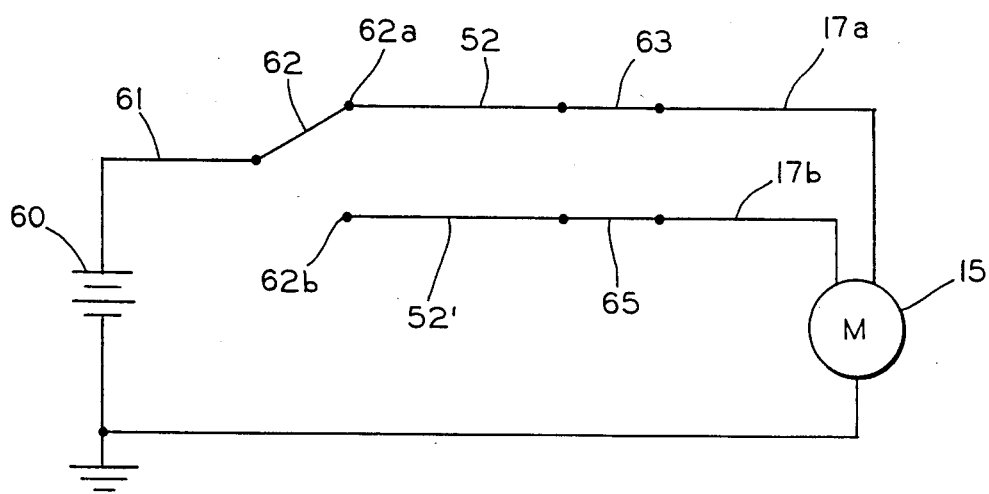
FIG. 8 is an electrical circuit schematic diagram of the movement limiting mechanism illustrated in FIGS. 4 and 5.

Referring now to FIG. 8, the operation of the limiting mechanism of the present invention will be explained in connection with the electrical schematic diagram illustrated therein. A source of electrical energy 60 is provided to selectively supply electrical current to the motor 15. The source of electrical energy 60 may, for example, be a vehicle battery. The source 60 is connected through a line 61 to the pole of a conventional single pole, double throw switch 62. The single pole, double throw switch 62 is typically disposed in the driver compartment of the vehicle for easy access by the driver. The single pole, double throw switch 62 is utilized to select one of two gear-engaging positions for the gear shifting mechanism described above. When the movable arm of the switch 62 is moved into engagement with a first switch contact 62a, the source of electrical energy 60 is connected to the conductor 52. When the movable arm of the switch 62 is moved into engagement with a second switch contact 62b, the source of electrical energy 60 is connected to the second conductor 52'.

The conductor 52 is connected through the single pole, single throw switch 63 to the first conductor 17a connected to the motor 15. As mentioned above, the single pole, single throw switch 63 is formed by the combination of the first stationary and movable contacts 42 and 43. Similarly, the conductor 52' is connected through the single pole, single throw switch 65 to the second conductor 17b connected to the motor 15. The single pole, single
is formed by the combination of the second stationary and movable contacts 42' and 43'.

For the purpose of explanation, let it be assumed that the drive nut 21 is initially positioned toward the right side of the shifter housing 11a as shown in FIGS. 2 and 3, that the gear changing mechanism is initially in the first gear-engaging position, and that the movable arm of the single pole, double throw switch 62 is initially engaged with the first switch contact 62a. If the driver desires to shift the gear changing mechanism to the second gear-engaging position, the movable arm of the switch 62 is moved into engagement with the second switch contact 62b. As a result, the source of electrical energy 60 is connected through the conductor 52', the single pole, single throw switch 65, and the second electrical conductor 17b to the motor 15. This occurs because the single pole, single throw switch 65 is normally closed by the coil spring 47', as described above.

The connection of the source of electrical energy 60 to the motor 15 through the second conductor 17b causes the motor 15 to rotate the screw 18 in the second rotational direction. Such rotation causes the drive nut 21 to move linearly toward the left. As the drive nut 21 moves, the shift sleeve 30 is biased to shift the gear changing mechanism from the first gear-engaging position to the second gear-engaging position. The drive nut 21, however, continues to move linearly toward the left into engagement with the elongated portion 43a' of the second movable electrical contact 43'. Further movement of the drive nut 21 causes the second movable electrical contact 43' to pivot as describe above until the single pole, single throw switch 65 is opened. When that occurs, the source of electrical energy 60 is disconnected from the motor 15, thereby disabling the motor 15 from further moving the drive nut 21 toward the left. The same movement limiting sequence of events occurs when the movable arm of the switch 62 is moved into engagement with the first switch contact 62a in order to shift the gear changing mechanism back to the first gear-engaging position. When the drive nut 21 engages the elongated portion 43a of the first movable electrical contact, the single pole, single throw switch 63 is opened, thereby disabling the motor 15 from further moving the drive nut 21 toward the right.

In accordance with the provisions of the patent statutes, the principal and mode of operation of the present invention have been explained and illustrated in its preferred embodiment. However, it must be understood that the present invention may be practiced otherwise than as specifically explained and illustrated without departing from its spirit or scope.

What is claimed is:

1. In a gear changing mechanism including drive nut means movable between first and second gear engaging positions and electric motor means selectively electrically connected to a source of electrical energy for moving the drive nut means, a movement limiting mechanism for limiting the amount of movement of the drive nut means comprising:

stationary electrical contact means electrically connected to one of the source of electrical energy and the electric motor means;

movable electrical contact means;

means for normally maintaining said movable contact means in engagement with said stationary contact means, said means for normally maintaining including a spring which is deformable along an axis thereof, said spring being formed from an electrically conductive material and being electrically connected between said movable electrical contact means and the other of the source of electrical energy and the electric motor means; and means formed on said movable electrical contact means extending into the path of movement of the drive nut means at a predetermined limit position such that the drive nut means engages said means at said predetermined limit position and moves said movable electrical contact means out of engagement with said stationary electrical contact means, thereby electrically disconnecting the electric motor means from the source of electrical energy and preventing further movement of the drive nut means.

2. The invention defined in claim 1 wherein said means for normally maintaining includes a coil spring.

3. The invention defined in claim 1 wherein said stationary electrical contact means is electrically connected to the electric motor means and said means for maintaining si electrically connected between said movable electrical contact means and the source of electrical energy.

4. The invention defined in claim 1 wherein said means formed on said movable electrical contact means includes an elongated arm formed on said movable electrical contact means.

5. In a gear changing mechanism including drive nut means movable between first and second gear engaging positions and electric motor means selectively electrically connected to a source of electrical energy for moving the drive nut means, a movement limiting mechanism for limiting the amount of movement of the drive nut means comprising:

first stationary electrical contact means electrically connected to one of the source of electrical energy and the electric motor means;

second stationary electrical contact means electrically connected to said one of the source of electrical energy and the electric motor means;

first and second movable electrical contact means;

first and second means for normally maintaining said first and second movable contact means in engagement with said first and second stationary contact means, respectively, each of said means for normally maintaining including a spring which is deformable along an axis thereof, said spring being formed from an electrically conductive material and being respectively electrically connected between said first and second movable electrical contact means and the other of the source of electrical energy and the electric motor means; and means formed on said first and second movable electrical contact means extending into the path of movement of the drive nut means at respective predetermined limit positions such that the drive nut means engages said means at said predetermined limit positions and moves said respective movable electrical contact means out of engagement with said corresponding stationary electrical contact means, thereby electrically disconnecting the electric motor means from the source of electrical energy and preventing further movement of the drive nut means.

6. The invention defined in claim 5 wherein each of said means for normally maintaining includes a coil spring.

7. The invention defined in claim 5 wherein each of said stationary electrical contact means is electrically connected to the electric motor means and each of said means for maintaining is electrically connected respectively between each of said movable electrical contact means and the source of electrical energy.

8. The invention defined in claim 7 further including switch means connected between each of said means for maintaining and the source of electrical energy for selectively electrically connecting the source of electrical energy to one of said means for maintaining.

9. The invention defined in claim 5 wherein each of said means formed on said movable electrical contact means includes an elongated arm formed on said movable electrical contact means.

* * * * *